Aug. 7, 1923.

J. C. BEEM 1,464,490

MILKING MACHINE

Filed Nov. 14, 1922

INVENTOR
J. C. Beem.
BY Fred G. Dieterich
ATTORNEYS

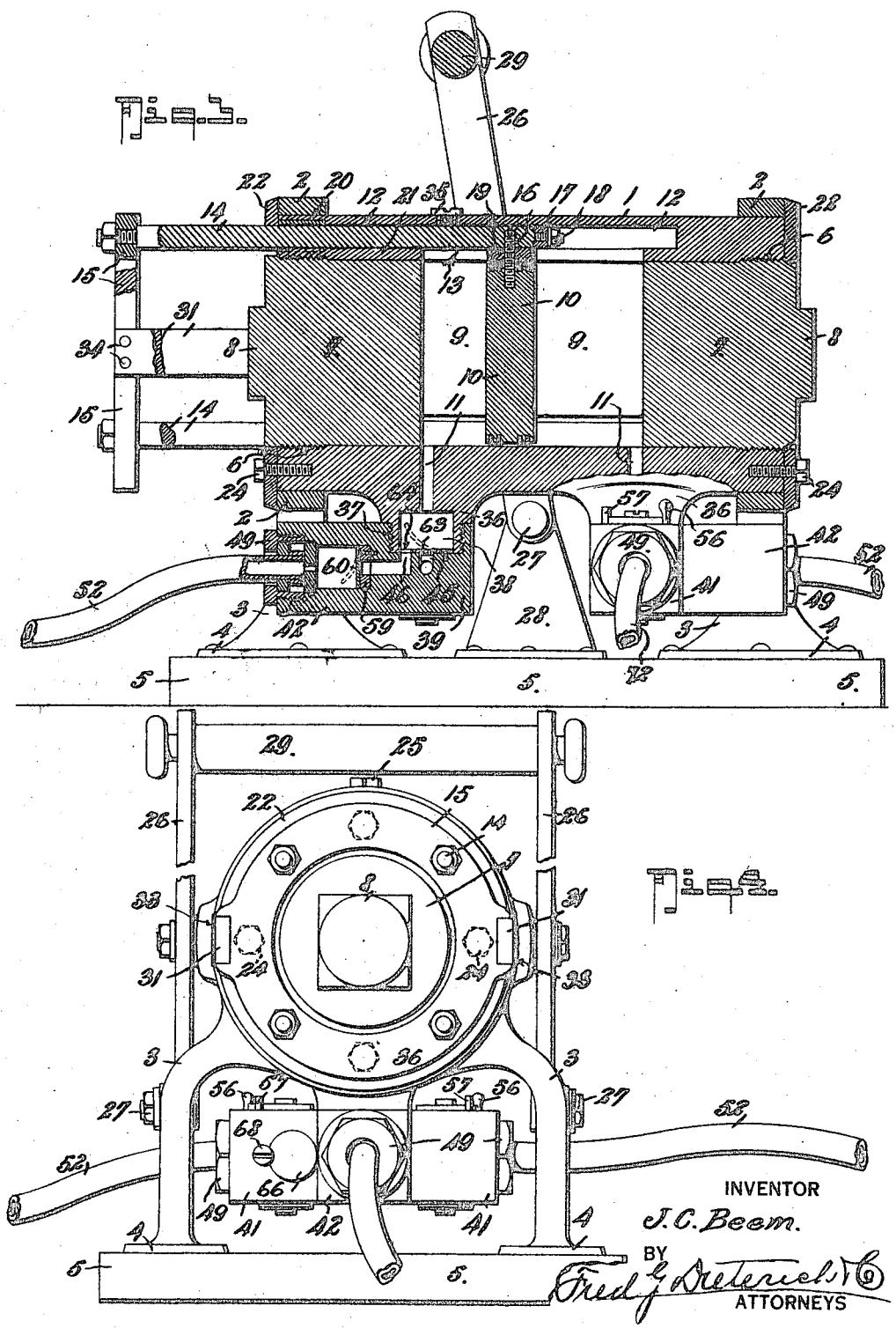

Aug. 7, 1923.
J. C. BEEM
MILKING MACHINE
Filed Nov. 14, 1922
1,464,490
3 Sheets-Sheet 3
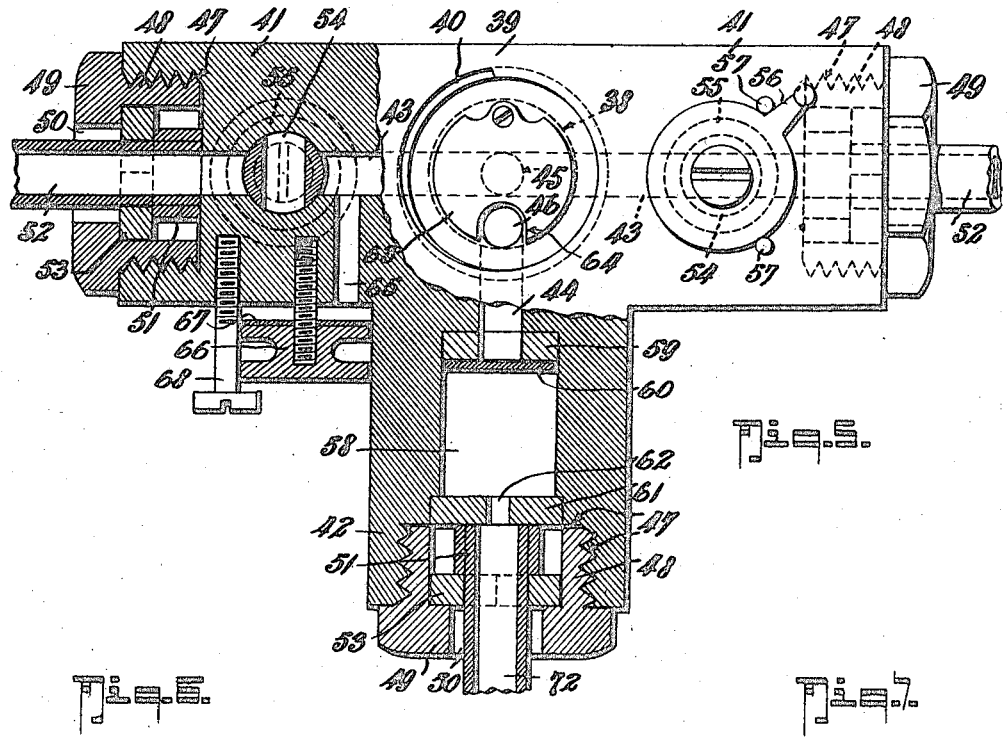
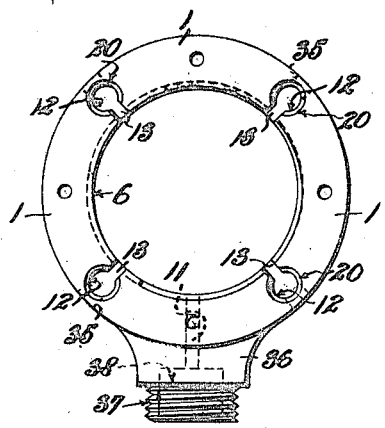
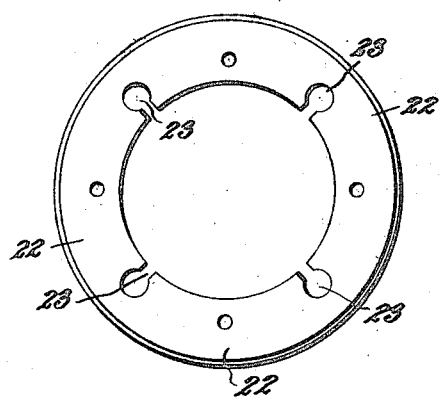
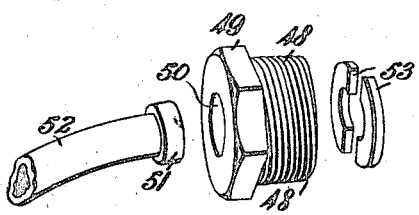
INVENTOR
J. C. Beem.
BY
Fred J. Dieterich & Co
ATTORNEYS Patented Aug. 7, 1923.

1,464,490

UNITED STATES PATENT OFFICE.

JOHN C. BEEM, OF SAWTELLE, CALIFORNIA.

MILKING MACHINE.

Application filed November 14, 1922. Serial No. 600,933.

*To all whom it may concern:*

Be it known that I, JOHN C. BEEM, a citizen of the United States, residing at Sawtelle, in the county of Los Angeles and State of California, have invented certain new and useful Improvements in Milking Machines, of which the following is a specification.

This invention relates to improvements in milking machines of that type disclosed in patents granted to me on May 10, 1921, numbered 1,377,546 and 1,377,547.

In the structure disclosed in my patents above referred to more or less difficulty and unnecessary expense is experienced in the use thereof due to the complicated construction of and arrangement of the milk receiving chambers and the valve mechanisms for causing and controlling the inflow and outflow of the milk thereinto and therefrom.

Therefore, the invention seeks to provide a simple, inexpensive and durable milking machine, adaptable to use upon varied numbers of a plurality of cows simultaneously, and which may be readily adjusted to suit the conditions necessary to the proper effective operation thereof under the said varied adjustments.

The invention further seeks to provide a structure so simple and compact in its nature as to reduce the labor incident to the thorough and sanitary cleansing thereof to the minimum and to provide parts so standardized as to permit of easy substitution and replacement at a minimum expense.

With the above and other objects in view which will hereinafter fully appear, the invention resides in those novel details of combination, construction and arrangement of parts, all of which will be first fully described, then be specifically pointed out in the appended claims, reference being had to the accompanying drawings, in which:

Figure 1 is a side elevation of the invention, several positions of the operating handle or lever being shown.

Figure 2 is a vertical cross section of the invention taken through the valve mechanism at one end of the machine.

Figure 3 is a vertical longitudinal section taken substantially on the line 3—3 on Figure 2, parts being shown in side elevation.

Figure 4 is an end elevation of the machine looking in the direction of the arrow on Figure 1.

Figure 5 is a horizontal section, parts being in plan view, of one of the valve mechanisms.

Figure 6 is a detail front end elevation of the main casing cylinder.

Figure 7 is a face view of the casing end clamp ring.

Figure 8 is a detail perspective view of the means for connecting the flexible pipe lines to the valve mechanisms.

In the drawings, in which like numerals of reference indicate like parts in all the figures, 1 represents the main casing member which is in the nature of a hollow cylinder open at both ends and which is constructed of any material suitable to the uses to which the same is put. End bearing rings 2, formed on supporting frames 3, are provided to accommodate the ends of the cylindrical casing 1. The frames 3 are suitably secured, as at 4, to the base member 5.

The open ends of the casing are internally threaded as at 6 to receive end closure plugs 7 which include, at their outer faces, squared turning heads 8 for the reception of a wrench or other turning implement, and the said plugs, threaded air tight into the said cylinder ends, close the said ends and provide therebetween a milk receiving chamber 9.

A piston 10 is adapted to be reciprocated within the said chamber 9 to effect the alternate sucking in and forcing out of the milk through the ports 11 in a manner later to be explained.

The wall of the cylindrical casing 1 is bored longitudinally to form a plurality of longitudinal bores 12 extending from one end of the said casing to a point slightly beyond the farthermost end of the chamber 9 and the said bores communicate with the interior of the chamber 9 through slotways 13 cut through the wall of the casing 1, as shown, see Figures 3 and 6. A plurality of piston operating rods 14 (one for each bore and slotway 12—13, four being shown), are slidable through the bores 12 and are caused to move longitudinally and in unison by reason of their rigid connection with the operating head or ring 15, as shown, see Figures 3 and 4, and the said rods 14 have connection with the piston 10, to effect the proper reciprocation thereof, through screw coupling pins 16 threaded through the inner ends of the said rods 14 and projecting into apertures formed therefor in the said piston. The screws 16 are countersunk and rounded off to permit of the easy sliding of the bars 14 through the bores 12 when the piston is being reciprocated in the manner soon to be explained.

The inner ends of the rods 14 are reduced and are fitted with packing washers 17 held in proper position upon the said rods by washer and nut connections 18 for the purpose of making a fluid tight fit for the said rod end and, to further effectively insure against fluid leak from the respective chambers formed at each side of the piston during travel, I provide a packing member 19 between the piston 10 and the rods 14 at the interval of each slotway 13, as shown. The end of each bore 12 is enlarged as at 20 to receive suitable packing and the ends of the slotways 13 now unused are suitably packed as at 21 so that leakage of milk from the chamber 9 to the exterior is impossible as is also the leakage from the chamber at one side of the piston 10, while working into the chamber at the other side thereof.

The casing 1 is held from longitudinal displacement from proper position within the end bearings 2 by clamping rings 22 and one of the said rings has cut out portions 23 to register with the bores 12 and slotways 13 of the casing 1, see Figure 7. The rings 22 are fixed in place on the casing ends by means of clamp screws 24, as shown, see Figures 1 and 3.

The casing 1 is held from displacement due to any rotative tendency by a single set screw 25, at the top of each end bearing, as shown, see Figure 1.

Proper reciprocation of the piston 10 is effected through the medium of a pair of levers 26, pivoted at 27 to bearing brackets 28 secured upon the base 5. The said levers are joined at their upper ends, to move in unison, by a cross bar 29, and are link connected as at 30, to a pair of operating or slide bars 31 slidable in ways 32 formed therefor on the circumferential surface of the casing 1 and the said bars pass through slotways 33 in the front ring bearing 2 and are rigidly secured, as at 34, to the operating head ring 15, see Figures 1 and 4.

By oscillating the lever 26—29 reciprocating motion is imparted to the piston 10 through 30, 15, 14 and 16 and the said piston operates to effect the milking of the cow or cows, as the case may be, in the manner soon to be described.

From the foregoing it will be readily understood that the plugs 7 may be removed for cleaning out the interior of the casing 1 and when so removed, the process of cleaning is not in any way hindered by projecting shoulders and it will be also apparent that by merely removing the front plug 7 and the packing 21 the piston 10 may be readily withdrawn with all its rods 14 attached thereto. I have made it also possible to withdraw the head 15 and its connected rods 14 without removing the piston 10 and plug 7. I provide a screw plug 35 at that point at which each of the screws 16 would be positioned when the piston is at the forward limit of its stroke and the said plug is of a size sufficient to permit the introduction of a tool and the withdrawal of the screw coupling pins 16, as desired.

The casing 1 is provided, at each point at which the ports 11 are bored, with a pendant hub portion 36 and the said hub portion is provided with an externally threaded portion 37 and a central bore forming a valve chamber 38.

Cooperative with each valve chamber 38 is a valve body 39. The construction of both valve bodies being identical the detailed description of one will suffice for both. The valve body includes an internally threaded socket 40 for threading the said body upon the threaded portion 37 of the hub 36 and the said body includes lateral projecting portions 41 and a central projecting portion 42. It should be noted that the ring bearing supports 3 are bowed to permit the turning of the valve body when threading the same into place, see Figures 3 and 4. The lateral portions 41 have lateral milk introduction passages 43 and the projection 42 is provided with a milk exhausting passage 44 and all such passages have communication with the chamber 38, those 43 through the vertical concentric passage 45 and the passage 44 through an eccentrically arranged vertical passage 46.

The outer ends of each of the projections 41 and 42 are provided with an internally threaded chamber 47 adapted to receive the threaded hollow plug 48 which includes a turning head or nut 49 and a central aperture 50 through which the enlarged ends 51 of the several milk conducting tubes 52 and 72 are inserted and held in fluid-tight relation with the respective valve body projections through the engagement therewith of the two part clamp rings 53, as shown. The induction tubes, connected to the laterals 41, are designated 52, and the exhausting tubes, leading from the laterals 42, are designated 72. The tubes 52 and 72 and the enlarged heads 51 are, of course, of rubber and when the said heads 51 are inserted through the apertures 50 in the clamping nut members 49, and the two part clamp ring, piece by piece, fixed around the said head and the said clamp nut member screwed home, the fluid-tight connections between the various tubes and passes are effectively made, see Figure 8.

By constructing the valve bodies as above described, provision is made for the milking of four cows simultaneously or any number from one to four with the same perfectness of operation. It is to be understood that each of the tubes 52 leading from the laterals 41 leads to any approved type of teat cup applied to the teats of the udder of the cow and are therefore styled induction tubes because therethrough the milk is inducted by suction, into the chamber 9. The tubes 72 which have connection with the projections 42 are styled the exhausting tubes since it is through the latter that the milk is exhausted, by pressure, into the receptacle provided for that purpose. No particular design of teat cup mechanism is illustrated since the same constitutes no part of the present invention.

At a point between the connections of the induction tubes with the lateral passages 43 and the vertical pass 45, on each side of said latter pass, is provided a milk flow regulating and cut-off valve 54 rotatable in a vertical bore crossing the said passages 43, having the usual fluid passage aperture therethrough and suitably packed, milk tight, as at 55. The valve is rotated to regulate the inflow of milk from the particular cow being milked or for the purpose of cutting off the particular passage 43 entirely by a turning crank 56 movable between a pair of limiting pins 57. Thus, it will be seen that it is possible to regulate the flow of milk through any particular passage 43 or set of passages 43 or to completely cut off any particular passage 43 or set of passages 43 and so it is possible to milk four cows simultaneously or any number within that total with the same perfectness of operation as will later appear.

The central projection 42 is provided with a large bore, merging with the milk passage 44, and the same constitutes a valve chamber 58. The valve chamber 58 is provided with a valve seat member 59 and the latter carries a flap check valve 60, see Figures 3 and 5. In addition to the conduit tube clamp connection at the end of the projection 42, the construction of which is standardized in this invention, a washer 61 is fitted and the same is provided with a central milk passage 62 which is restricted for a purpose later to be explained.

A flap check valve 63 is mounted within the central valve chamber 38, over the vertical pass 45, and the said flap includes a cut out portion 64 extending around the vertical exhausting pass 46, the purpose for which will also be later explained, see Figures 3 and 5.

Each valve body 39 is provided at some point between the valves 54, with an air duct 65 adapted to pass air into the lateral passages 43 when it is so desired. For closing this air duct 65 when its function is unnecessary and therefore undesirable, I provide a closure plug 66 which includes an air port engaging face 67 covered with some material which will effect the closing off of atmospheric communication with the passages 43 when it is so desired. The plug 66 has a turning head and is mounted upon a screw which is threaded into the socket provided therefor in the valve body 39 and, for preventing the possibility of the plug being withdrawn completely from the valve body, I provide a stop screw 68 which includes a head projecting into the path of outward movement of the plug 66 as shown, see Figure 5.

The assembly:—

The following will give a clear idea of the simplicity of construction of the invention and of its ready adaptability to proper cleansing.

The ring bearings carried by their supporting frames 3 would be properly slipped over the ends of the casing 1 and then be secured to the base as at 4. The rear plug 7 would then be applied fluid-tight into the rear end of the casing through the medium of a wrench applied to the squared head 8. The rear ring 22 would next be applied and fixed by the screw bolts 24 and the casing end securely clamped against displacement by the clamping of the screw 25 in the top of the ring 2. The front clamp screw 25 could now be screwed home and the casing is now firmly mounted ready for the application of the piston and the operating means therefor. The piston 10, the packings 19, the screws 16, the rods 14, the packings 17—18, the operating head 15 and the bars 31 could then be assembled as a unit and slid, as a whole, into place. The front plug 7 would then be properly inserted fluid-tight into the front end of the casing. The front ring clamp 22 should have been applied to the casing end as the piston etc. were being inserted, but not clamped on, so that the same may be slid back to permit the proper introduction of the packing elements 19 and 20 after which the said ring clamp 22 would be fixed into proper position on the front end of the casing. The brackets 28 would then be fixed to the base 5 and the levers linked as at 30 to the bars 31 when the casing and piston structures would be ready for operation. The valve bodies 39 are made as complete units and would be applied as such by threading the same onto the threaded hubs 37 of the casing 1. The various tubes 52 and 72 would then be applied as has been heretofore explained and the machine is ready for operation as follows.

*Operation.*

It should be clearly understood that oscillation of the lever 26 imparts reciprocatory motion to the piston 10 and that such reciprocation of the piston creates pressure at one side of the piston, in the direction of travel, and suction at the other side thereof or behind the same. Thus it will be seen that each port 11 acts as an induction port, when the piston is moving away from such port, and as an exhausting port, when the piston is moving toward such port, so that milk is being sucked into the port at one end and forced out of the port at the opposite end simultaneously and continuously so long as the operation is continued.

Assuming that the piston is being moved toward the right, as shown in Figure 3, milk will be pumped from the udder of each of the pair of cows cooperating through the lateral tubes 52 with the lateral passages 43 at that end of the machine which is at the left of Figure 3. The milk thus pumped flows through each of the said passages 43, up through the passage 45, the flap valve 63 being raised by the suction, and through the port respective chamber 38 and port 11 into the chamber 9 behind the piston. Simultaneously, the valve mechanism to the right of the figure is functioning to permit the exhausting of the milk which the piston is forcing before it as follows: The milk passes out through the port 11 into the chamber 38. The flap valve is closed, and held so by the pressure of the fluid, to effectively shut off communication with the passages 43 to thereby prevent the forcing of the liquid back again to irritate the cows from which it was originally drawn. From the chamber 38 the milk flows through the cut out portion 64 of the flap valve, through the passage 44, through the valve 60 and tube 72 to the collecting receptacle provided for the purpose. The valve 60 acts as a back check valve to prevent the possibility of the milk being sucked back out of the receptacle last mentioned on the next stroke of the piston. The valves function to first suck in then exhaust the milk, and the operation is such that when the chamber is filled at the end of the stroke in either direction, suction ceases on the teats from which the milk was drawn, giving them a rest from the action of the pump while the milk is being discharged. Thus, the teats are allowed to fill naturally from the udder of each cow, which renders the milking process less annoying. It will be noticed that the opening 61 through which the exhausting milk is forced to pass is restricted. This is done to make the milk pass out more slowly than the inflow and to thereby insure the continuity of and the degree of suction necessary. This is necessary because the suction would be broken and the operation of the machine affected if the milk should at any time flow out more rapidly than the inflow at the opposite end. By the use of the valves 54 each lateral passageway 43 is subject to control as a unit and as such may be regulated as to the amount of milk to flow therethrough or closed off entirely in which event the passageway at the opposite side only will function. It is also possible to cut off both valves 54 at one end of the machine to thereby render that complete side of the machine inoperative and to permit only those passages at the opposite machine end to function. In the last described adjustment it is necessary that air be admitted into the chamber 9 to permit the piston to function properly and for this purpose the air duct 65 is opened to atmospheric communication by turning back the head 66 as hereinbefore described.

To "strip" the cows I cut off three of the cows by proper turning of the valve 54, and work the piston slowly at the partial stroke and small quantities may be readily discharged.

By reference to the description of the assemblage of the machine it will be readily apparent how thoroughly and practically the machine may be knocked down for scouring and sunning.

The machine may also be well cleansed without completely disassembling the same by merely pumping hot water therethrough in the same manner in which the milking process is carried in.

What I claim is:

1. A milking machine, comprising a cylindrical open ended casing, supports for said casing, end closing plugs removably mounted to close the said casing ends and to form therebetween a milk receiving chamber, a piston reciprocable within said chamber, means for reciprocating the said piston to alternately create suction and to exert pressure at opposite sides of the said piston and within the said chamber, an inflow and outflow port at each end of the said chamber, and a single valve body cooperative with each said port for controlling the inflow and outflow of the fluid into and from the said chamber.

2. A milking machine, comprising a cylindrical open ended casing, supports for said casing, end closing plugs removably mounted to close the said casing ends and to form therebetween a milk receiving chamber, a piston reciprocable within said chamber, means for reciprocating the said piston to alternately create suction and to exert pressure at opposite sides of the said piston and within the said chamber, an inflow and outflow port at each end of the said chamber, a single valve body cooperative with each said port for controlling the inflow and outflow of the fluid into and from the said chamber, and means for causing one side only of the machine to function.

3. A milking machine, comprising a cylindrical open ended casing, end supports for said casing, end clamping rings for retaining said casing within said supports, means for preventing displacement of said casing by rotation, end closing plugs removably mounted to close the said casing ends and to form therebetween a milk receiving chamber, a piston reciprocable within said chamber, longitudinal bores in the casing wall, slotways joining said bores and the casing bore, like bores and slots in one of the said end clamping rings, operating rods slidable in said bores, an operating head fixed to all said rods, operating bars having guide cooperation with grooves in the casing circumference and fixed to said operating head, means for removably joining the operating rods to the said piston, oscillating levers link-connected to the said operating bars for reciprocating the said piston to alternately create suction and to exert pressure at the opposite sides of the said piston and within the said chamber, an inflow and outflow port at each end of the said chamber, and a single valve body cooperative with each port for controlling the inflow and outflow of the fluid into and from the said chamber.

4. A milking machine, comprising a cylindrical open ended casing, supports for said casing, end closing plugs removably mounted to close the said casing ends and to form therebetween a milk receiving chamber, a piston reciprocable within said chamber, means for reciprocating the said piston to alternately create suction and to exert pressure at opposite sides of the said piston and within the said chamber, an inflow and outflow port at each end of the said chamber, a single valve body cooperative with each said port for controlling the inflow and outflow of the fluid into and from the said chamber, including a plurality of milk induction passages and a single milk exhausting passage, valves for controlling the flow of milk into the passages, and means for restricting the outflow of the milk being exhausted.

5. A milking machine, comprising a cylindrical open ended casing, end supports for said casing, end clamping rings for retaining said casing within said supports, means for preventing displacement of said casing by rotation, end closing plugs removably mounted to close the said casing ends and to form therebetween a milk receiving chamber, a piston reciprocable within said chamber, longitudinal bores in the casing wall, slotways joining said bores and the casing bore, like bores and slots in one of the said end clamping rings, operating rods slidable in said bores, an operating head fixed to all said rods, operating bars having guide cooperation with grooves in the casing circumference and fixed to said operating head, means for removably joining the operating rods to the said piston, oscillating levers link-connected to the said operating bars for reciprocating the said piston to alternately create suction and to exert pressure at the opposite sides of the said piston and within the said chamber, an inflow and outflow port at each end of the said casing, a single valve body cooperative with each port for controlling the inflow and outflow of the fluid into and from the said chamber, including a plurality of milk induction passages and a single milk exhausting passage, valves for controlling the flow of milk into the passages, and means for restricting the outflow of the milk being exhausted.

6. A milking machine, comprising a cylindrical open ended casing, supports for said casing, end closing plugs removably mounted to close the said casing ends and to form therebetween a milk receiving chamber, a piston reciprocable within said chamber, means for reciprocating the said piston to alternately create suction and to exert pressure at opposite sides of the said piston and within the said chamber, an inflow and outflow port at each end of the said chamber, a single valve body cooperative with each port for controlling the inflow and outflow of the fluid into and from the said chamber, including a plurality of milk induction passages and a single milk exhausting passage, valves for controlling the flow of milk into the passages and completely closing off one or all of such passages, adjustable means for admitting air into the said passages when said valves are closed off, and means for restricting the outflow of the milk being exhausted.

7. A milking machine, comprising a cylindrical open ended casing, supports for said casing, end closing plugs removably mounted to close the said casing ends and to form therebetween a milk receiving chamber, a piston reciprocable within said chamber, means for reciprocating the said piston to alternately create suction and to exert pressure at opposite sides of the said piston and within the said chamber, an inflow and outflow port at each end of the said chamber, a single valve body cooperative with each said port for controlling the inflow and outflow of the fluid into and from the said chamber, including a plurality of milk induction passages and a single milk exhausting passage, valves for controlling the flow of milk into the passages, milk conduit pipes communicating with the outer ends of all such passages, enlarged heads formed upon said conduit pipes, two-part clamping rings for engaging said enlarged heads to clamp them fluid tight, clamping nut members for forcing the said clamping rings into position, an aperture in each said nut member for permitting the insertion therethrough of the said enlarged heads, and means for restricting the outflow of the milk being exhausted.

8. A milking machine, comprising a cylindrical open ended casing, end supports for each casing, end clamping rings for retaining said casing within said supports, means for preventing displacement of said casing by rotation, end closing plugs removably mounted to close the said casing ends and to form therebetween a milk receiving chamber, a piston reciprocable within said chamber, longitudinal bores in the casing wall, slotways joining said bores and the casing bore, like bores and slots in one of the said end clamping rings, operating rods slidable in said bores, an operating head fixed to all said rods, operating bars having guide cooperation with grooves in the casing circumference and fixed to said operating head, means for removably joining the operating rods to the said piston, oscillating levers link-connected to the said operating bars for reciprocating the said piston to alternately create suction and to exert pressure at the opposite sides of the said piston and within the said chamber, an inflow and outflow port at each end of the said chamber, a single valve body cooperative with each port for controlling the inflow and outflow of the fluid into and from the said chamber, including a plurality of milk induction passages and a single milk exhausting passage, valves for controlling the flow of milk into the passages and for completely closing off one or all of such passages, adjustable means for admitting air into the said passages when said valves are closed off, and milk conduit pipes communicting with the outer ends of all such passages, enlarged heads formed upon said conduit pipes, two-part clamping rings for engaging said enlarged heads to clamp them fluid-tight, clamping nut members for forcing the said clamping rings into position, an aperture in each said nut member for permitting the insertion therethrough of the said enlarged heads, and means for restricting the outflow of the milk being exhausted.

9. In a milking apparatus, a main milk receiving chamber, means including a reciprocable piston for alternately creating suction for gathering the milk into such chamber and for ejecting the gathered milk from such chamber, a supplemental chamber combined with the main chamber, an inlet and an outlet port connecting the two chambers, an outlet port in the supplemental chamber through which the milk discharged from the main chamber passes and a valve cooperative with the inlet port to the main chamber that opens under the suction stroke of the piston and which closes the said inlet port on the ejecting stroke of the piston, the outlet connecting the two chambers being at all times open.

10. A milking machine comprising two like units, each unit including a main milk receiving chamber, means including a reciprocable piston adapted for first gathering the milk into such chamber and then ejecting the gathered milk from such chamber, a supplemental chamber combined with the main chamber, an inlet and an outlet port connecting the two chambers, the supplemental chamber having an outlet through which the milk ejected from the main chamber passes, a valve cooperative with the inlet port to the main chamber which opens under the induction stroke of the piston and which closes the said inlet port under the milk ejecting stroke of the piston, the outlet port connecting the two chambers being at all times open and a control valve in each unit for cutting out either or both units from operative adjustment.

11. A milking machine comprising two like units, each unit including a main milk receiving chamber, means including a reciprocable piston adapted for first gathering the milk into such chamber and then ejecting the gathered milk from such chamber, a supplemental chamber combined with the main chamber, an inlet and an outlet port connecting the two chambers, the supplemental chamber having an outlet through which the milk ejected from the main chamber passes, a valve cooperative with the inlet port to the main chamber which opens under the induction stroke of the piston and which closes the said inlet port under the milk ejecting stroke of the piston, the outlet port connecting the two chambers being at all times open and a control valve in each unit for cutting out either or both units from operative adjustment, an air inlet in communication with the milk intake to each unit, and means for closing said air inlet at times.

12. A milking machine comprising an open ended cylindrical casing, supports for the casing, end closing plugs removably mounted to close the casing end and to form therebetween a main milk receiving chamber, a piston reciprocable within the main chamber, means for reciprocating the piston to alternately create suction and to exert pressure at opposite sides of the said piston and within the main chamber, a supplemental chamber cooperative with each of the opposite ends of the main chamber, inlet and outlet ports connecting the ends of the main chamber and their respective cooperative supplemental chambers, a valve cooperative with each inlet port to the main chamber ends, the said valve operating to open the inlets to the main chamber on the suction strokes of the piston and to close the said inlet on the ejecting or pressure strokes of the piston, and means for cutting out the inlet to the main chamber at either end thereof to cause the other end only of the machine to function.

JOHN C. BEEM.